March 15, 1960
J. C. TRIPPLEHORN
2,928,472
OPPOSED SLOT SCRAPER AND GUIDE
Filed July 16, 1957
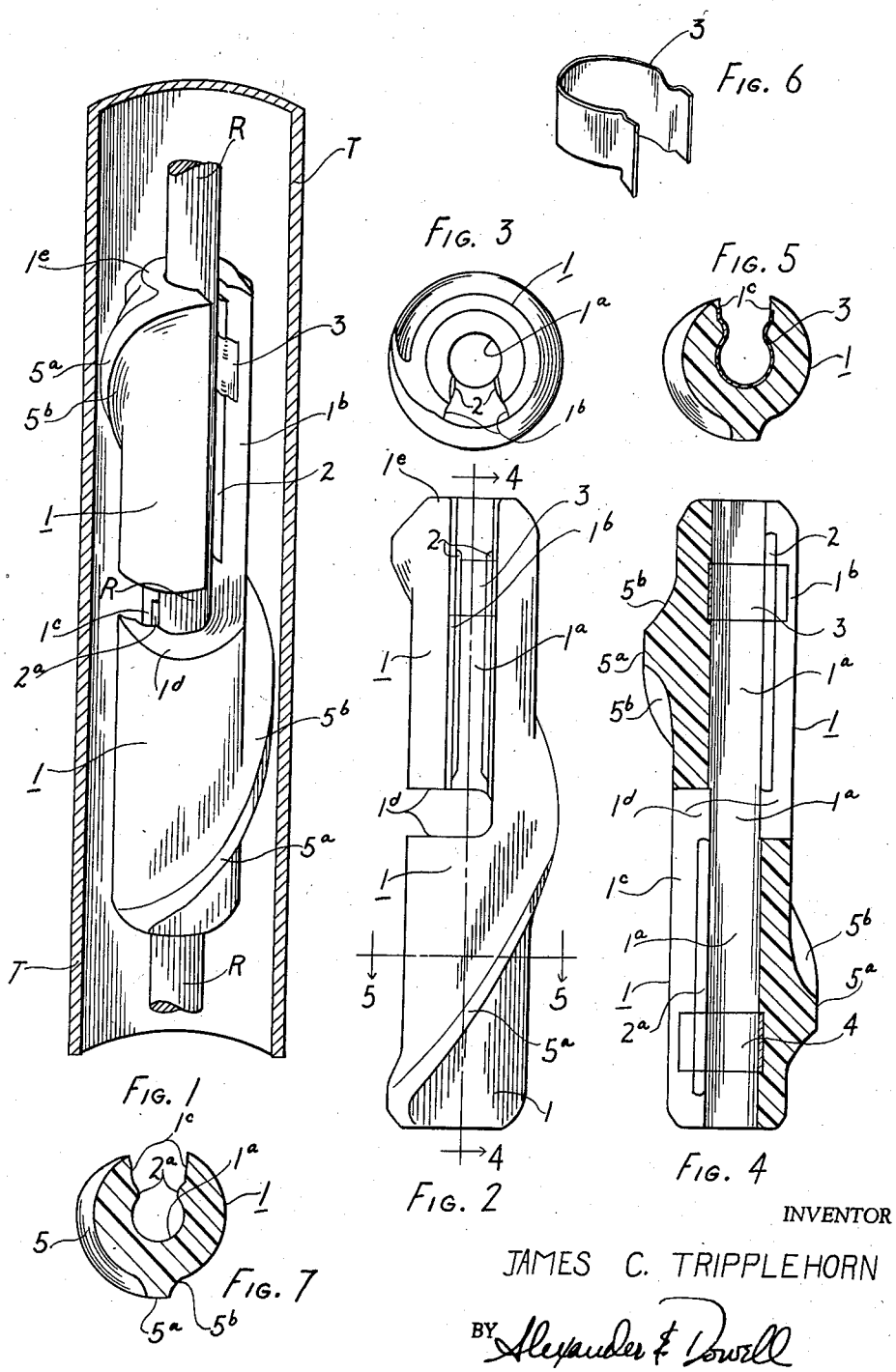
INVENTOR
JAMES C. TRIPPLEHORN
BY Alexander & Dowell
ATTORNEY

United States Patent Office 2,928,472
Patented Mar. 15, 1960

2,928,472

OPPOSED SLOT SCRAPER AND GUIDE

James C. Tripplehorn, Pampa, Tex.

Application July 16, 1957, Serial No. 672,267

4 Claims. (Cl. 166—176)

This invention relates to paraffin scrapers and rod guides of the type intended to be mounted at spaced intervals along sucker rods while the latter are being reciprocated within a tubing string during the pumping of an oil well. More particularly, the invention relates to scrapers and guides which are made of resilient deformable material and which are provided with a novel structure for engaging the sucker rod and for frictionally preventing slipping of the scrapers on the rod.

A principal object of the invention is to provide a scraper and guide which may be securely installed at any position along the length of a sucker rod between the tool joints at the ends thereof without necessity of altering the standard sucker rod or performing any operation thereon which might weaken the same, as for instance welding. More particularly, it is a principal object of the present invention to provide a plastic scraper having a particular type of frictional rod-engaging structure which will be referred to hereinafter as opposed-slot mounting.

It is another primary object of the present invention to provide an opposed-slot scraper and guide which, by virtue of its built-in resilience, provides a powerful frictional grip on the rod which prevents slipping of the scraper and guide axially thereof. Two illustrative embodiments of the present invention are hereinafter shown and described, wherein in one embodiment the scraper and guide is made of a plastic material which, by virtue of its own resilience, provides a tight grip on the sucker rod, and the other embodiment being similar to the first embodiment but including in addition thereto one or more spring steel clips which augment the grip of the resilient scraper and guide on the rod. These embodiments will be described in detail later on in this specification.

It is a further very important object of the present invention to provide an opposed-slot scraper and guide which is molded from a plastic which, in the presence of the high temperatures and corrosive fluids often found in oil wells, exhibits excellent stability with respect to its mechanical dimensions; it is an electrical insulator to prevent electrolysis; and in addition has excellent acid and oil resistant properties. The range of plastics which exhibit satisfactory physical and chemical properties, and at the same time may be molded to the desired form include the following:

Vinylidene chloride—rigid compound
Polyamides—molding type—Nylons 1001 known as Zytel
Polytetra-fluoro ethylene
Polychloro-trifluoro ethylene
Polymethyl alpha chloro-acrylate
Polyester diallyl phthalate
Poly acetal resin One of the properties exhibited by scrapers and guides made of one of the above plastics includes the important characteristic that the very paraffin which the device, according to the present invention, is intended to scrape has very little tendency to stick to the plastic surfaces since these surfaces are very smooth and non-porous. This is one important and unobvious property which distinguishes the present plastic scrapers and guides from metal devices, the paraffin having a strong tendency to adhere to the metal scrapers just as to the other metal parts and to build up on the scraper as well as on the tubing and on the sucker rod.

It is another object of the invention to provide in a scraper and guide having an axial bore therethrough two opposed-slots disposed adjacent one another and axially of the device and facing outwardly from the bore on opposite sides thereof, the scraper and guide also being provided with a transverse arcuate slot across one side of the device, which transverse slot joins together the opposed axial slots so as to provide both a mounting means and a connection from one axial slot to the other to form a composite fluid passage comprising the three aforementioned slots, which passage is continuous and extends all the way through the device so as to facilitate the flow of well fluids therepast.

It is another object of the present invention to provide a device having transverse end surfaces which are rounded at their outer peripheries where they meet the outer longitudinal surfaces of the scraper so as to provide the scraper with tapered ends to reduce the tendency of the latter to snag upon tubing joints, and to facilitate the free reciprocation of the devices within the tubing.

It is a further object of the present invention to provide a novel scraper and guide which is rugged and durable in use and which is inexpensive to manufacture, a large number of such devices being necessary for use within the average oil well while the latter is being pumped.

Other objects and advantages of the present invention will become apparent during the following discussion of the drawing, wherein:

Figure 1 is a perspective view of one of the present paraffin scrapers and guides mounted on a sucker rod, and located within a length of pump tubing, the tubing being shown cut away so as to make the device visible.

Fig. 2 is an elevation view of the paraffin scraper and guide shown in Fig. 1.

Fig. 3 is an end view of the paraffin scraper and guide shown in Fig. 2.

Fig. 4 is a section view taken along lines 4—4 of Fig. 2.

Fig. 5 is a section view taken along line 5—5 of Fig. 2.

Fig. 6 is an enlarged perspective view of the spring clip inserted in the device shown in the first five figures, for increasing the frictional grip thereof on the sucker rod.

Fig. 7 is a cross sectional view similar to that shown in Fig. 5, but illustrating a modified form of paraffin scraper and guide wherein the entire structure consists of a one-piece molded plastic, and contains no spring clip.

Referring now to the drawing, Fig. 1 shows a sucker rod R disposed within a length of pump tubing T, the latter being shown in cross section so as to illustrate a paraffin scraper and guide according to the present invention located within the tubing.

The scraper and guide illustrated in Fig. 1 includes a substantially cylindrical body 1 having a bore 1a therethrough. In the vicinity of the upper half of this bore a slot 1b is provided through the wall of the body 1 and entering said bore 1a. Another similar slot 1c is located in the vicinity of the lower portion of the bore 1a and likewise extends through the wall of the body 1 and enters into the lower portion of the bore 1a. The slots 1b and 1c are opposed to each other both in the sense that they extend longitudinally away from each other in opposite directions with respect to the longitudinal center of the scraper, and also in the sense that they open in mutually opposite directions radially of the body 1. As can best be seen in Figs. 1, 2 and 4, the axial slots 1b and 1c are joined together by a transversally disposed arcuate slos 1d, this slot serving to join the slots 1b and 1c for the purpose of providing a continuous oil passage through the body 1, and in addition serving as a mounting slot to permit installation of the device on the sucker rod R in the manner hereinafter described.

With regard to Figs. 3, 5 and 7 it will be seen that the slots 1b and 1c are tapered so as to enlarge outwardly from the bore 1a. The bore 1a is deliberately made slightly smaller in diameter than the diameter of the sucker rod R on which the device is intended to be mounted. By thus making the bore slightly smaller, the device when installed on the rod will frictionally grip the sucker rod R very tightly and thus prevent slipping of the scraper and guide on the rod. The outward tapering of the axial slots 1b and 1c provide outer openings which are somewhat wider than the diameter of the rod R so that the rod may be freely received in the outer portions of the slots 1b and 1c during the initial steps of installing the devices on the sucker rod. Within the tapered slots 1b and 1c are located means designed to increase the grip of the device on the sucker rod. In Figs. 1 through 6, inclusive, there are two types of grip-increasing means, whereas in the modification illustrated in Fig. 7 there is only one type of grip-increasing means. In the form shown in the first six drawings, the slot 1b includes a pair of plastic ribs 2, and the slot 1c has located therewithin another pair of plastic ribs 2a, these ribs being located on both sides of each slot and being integral with the plastic material of which the scraper is formed. In addition to these plastic ribs, in the embodiment shown in Figs. 1 through 6 there is also provided a plurality of spring steel clips which are inserted in bore 1a of the body 1 and which are C-shaped so that they have openings which register with the slots 1b or 1c. The spring clips 3 and 4 are inserted in the mold at the time the scraper is being molded, and are so shaped as to lie flush with the bore and slot into which they are inserted. These spring clips are thus retained in recesses which are formed at the time of molding and are complementary in shape with the portion of the bore and slot in which they are inserted, although up to the present time it has not been possible to provide any satisfactory plastic-to-metal bond. At any rate, the recesses in which the clips 3 and 4 are housed serve to retain them within the plastic scraper in a satisfactory manner. The number of the axial lengths of such clips may be varied to suit anticipated needs.

The plastic body 1 is provided with a helical scraping blade 5 which starts at one end of the body and extends therearound to the other end. In the form shown in the present drawing the helix passes around the body only once, but it is to be understood that it is entirely possible for it to pass around the body for more than one convolution, even though it may be necessary to break the blade where it crosses the slots. The blade 5 has an outer bearing surface 5a intended to rub on the inside surface of the tubing T, the surface 5a actually coinciding with the surface of an imaginary cylinder which is concentric with the axis of the scraper. The sides 5b of the blade are tapered or filleted into the cylindrical body portion 1 so as to provide smooth surfaces having no sharp corners in which the paraffin might tend to collect. It will be noted that the ends of the blade 5 are tapered inwardly and blend smoothly into the rounded ends of the scraper and guide where the outer cylindrical body surfaces join the flat end surfaces 1e. The inward tapering of the cylindrical surfaces of the body 1 and of the bearing surface 5a as it approaches the ends of the blade serves to prevent snagging of the device on the tubing joints, etc.

Like reference characters are employed to illustrate similar parts of the two forms shown respectively in the first five figures and shown in Fig. 7.

In operation, when it is desired to attach the scraper and guide shown in the drawings to the appropriate size of sucker rod, the device is turned so that its axis is disposed transversely with respect to the axis of the sucker rod, and the sucker rod is then passed into the transverse slot 1d of the scraper and guide. Next, the latter is rotated so that its axis approaches the axis of the sucker rod and so that the sucker rod extends into the axially disposed slots 1b and 1c. Then, the scraper and guide is given either an additional blow or is pressed, as by a hydraulic press, until the sucker rod is snapped into the bore 1a extending toward both ends of the scraper and guide from the center thereof. Because of the presence of the ribs 2 and 2a, it requires a great deal of force to pass the sucker rod into the bore between the ribs, but once positioned in the bore the sucker rod is very tightly gripped by the device. Depending upon the magnitudes of the expected axial forces tending to move the device along the sucker rod either the form without supplementary steel clips, as shown in Fig. 7, may be used, or else in the case of anticipated severe stresses, the scraper and guide, according to Figs. 1 through 5, may be employed. It is extremely important that, once positioned on the sucker rod R, the device must hold tightly and must maintain its installed position.

Working models of both forms of the device have been made and have proven very successful when used in oil pumping operations in relatively deep wells. The actual devices being tested are made of nylon which is molded in the desired form either with or without the spring clips 3 and 4. Nylon is extremely hard and has a grip of its own on the sucker rod which is quite similar to the grip of the steel spring clip.

The scope of the present invention is not to be limited by the exact forms shown in the drawing, for obviously changes may be made therein within the scope of the appended claims.

I claim:

1. In oil well equipment, a scraper and guide to be attached to a sucker rod, said scraper and guide comprising a body of homogeneous deformable material with a longitudinal bore therethrough to receive the rod, the diameter of the bore being slightly less than the diameter of the rod, and said body having two longitudinal slots therethrough communicating with said bore and said slots each extending from substantially the longitudinal center of the body to an opposite end thereof, the slots opening from the bore in mutually opposite radial directions and being narrower in width than the diameter of the bore at their junctures therewith, and said body having a centrally located transverse slot therethrough joining the two longitudinal slots, the width of the transverse slot being at least as great as the diameter of the rod, and said body including a scraping blade formed integrally therewith and standing outwardly from the surface thereof and extending therearound in the form of a helix running from one end of the body to the other end, said blade crossing each of the three slots at an oblique angle with respect to the direction in which the slot extends and on the other side of the body from the slot, whereby the blade reinforces the body against cracking at locations opposite each of the three slots.

2. In a scraper and guide as set forth in claim 1, at least one C-shaped spring clip embedded in said body and surrounding a length of said bore and having an opening registering with the sides of one of said longitudinal slots.

3. In a scraper as set forth in claim 1, said blade having an outer bearing surface lying in a cylinder coaxial with the axis of the bore and the ends of the body and of the blade being rounded from their longitudinal outer surfaces to transversely disposed end surfaces of the body.

4. The scraper and guide as set forth in claim 1, wherein said material is nylon.

References Cited in the file of this patent

UNITED STATES PATENTS

| | | |
|---|---|---|
| 1,750,851 | Meier | Mar. 18, 1930 |
| 2,436,994 | Gillespie | Mar. 2, 1948 |
| 2,604,364 | Ward | July 22, 1952 |
| 2,655,113 | Ward | Oct. 13, 1953 |
| 2,712,853 | Irwin | July 12, 1955 |
| 2,793,917 | Ward | May 28, 1957 |